United States Patent [19]

Ray

[11] 4,275,689
[45] Jun. 30, 1981

[54] INTERNAL COMBUSTION ENGINE

[76] Inventor: Earl L. Ray, 113 Chestnut Pl., Rte. 2 - Box 393.A, Arden, N.C. 28704

[21] Appl. No.: 11,425

[22] Filed: Feb. 12, 1979

Related U.S. Application Data

[63] Continuation-in-part of Ser. No. 814,662, Oct. 27, 1977, abandoned.

[51] Int. Cl.³ .................... F02B 25/12; F02B 17/00
[52] U.S. Cl. .................... 123/53 B; 123/65 A; 123/257; 123/295
[58] Field of Search ............ 123/53 R, 53 B, 65 R, 123/65 A, 59 EC, 70 R, 191 S, 191 R, 193 H, 193 CH, 32 ST, 32 SP, 430, 431, 295, 257

[56] References Cited

U.S. PATENT DOCUMENTS

| | | | |
|---|---|---|---|
| 1,795,099 | 3/1931 | Stuart | 123/53 B |
| 2,156,665 | 5/1939 | Mallory | 123/32 ST |
| 2,159,224 | 5/1939 | Osborne | 123/53 B |
| 2,421,884 | 6/1947 | Holmes | 123/53 B |
| 2,735,413 | 2/1956 | Meyer et al. | 123/32 ST |
| 3,492,979 | 2/1970 | Osojnak | 123/53 B |
| 3,766,894 | 10/1973 | Mize | 123/53 B |
| 3,934,562 | 1/1976 | Isaka | 123/32 ST |
| 4,079,705 | 3/1978 | Buchner | 123/53 B |
| 4,124,000 | 11/1978 | Genslak | 123/191 S |
| 4,180,021 | 12/1979 | Yanagihara | 123/32 ST |

FOREIGN PATENT DOCUMENTS 219429 12/1958 Australia ........................ 123/53 B Primary Examiner—Ira S. Lazarus
Assistant Examiner—Magdalen Moy
Attorney, Agent, or Firm—Stevens, Davis, Miller & Mosher

[57] ABSTRACT

An improved multicylinder internal combustion engine is described for efficiently producing power. The internal combustion engine described is fuel injected with a stoichiometric fuel mixture to develop a stratified charge suitable for igniting a leaner mixture of fuel and air. The charge is advantageously introduced into two adjacent cylinders for igniting a fuel mixture common to both cylinders. Improved fuel injection and super charging of the internal combustion engine is also described herein.

6 Claims, 11 Drawing Figures

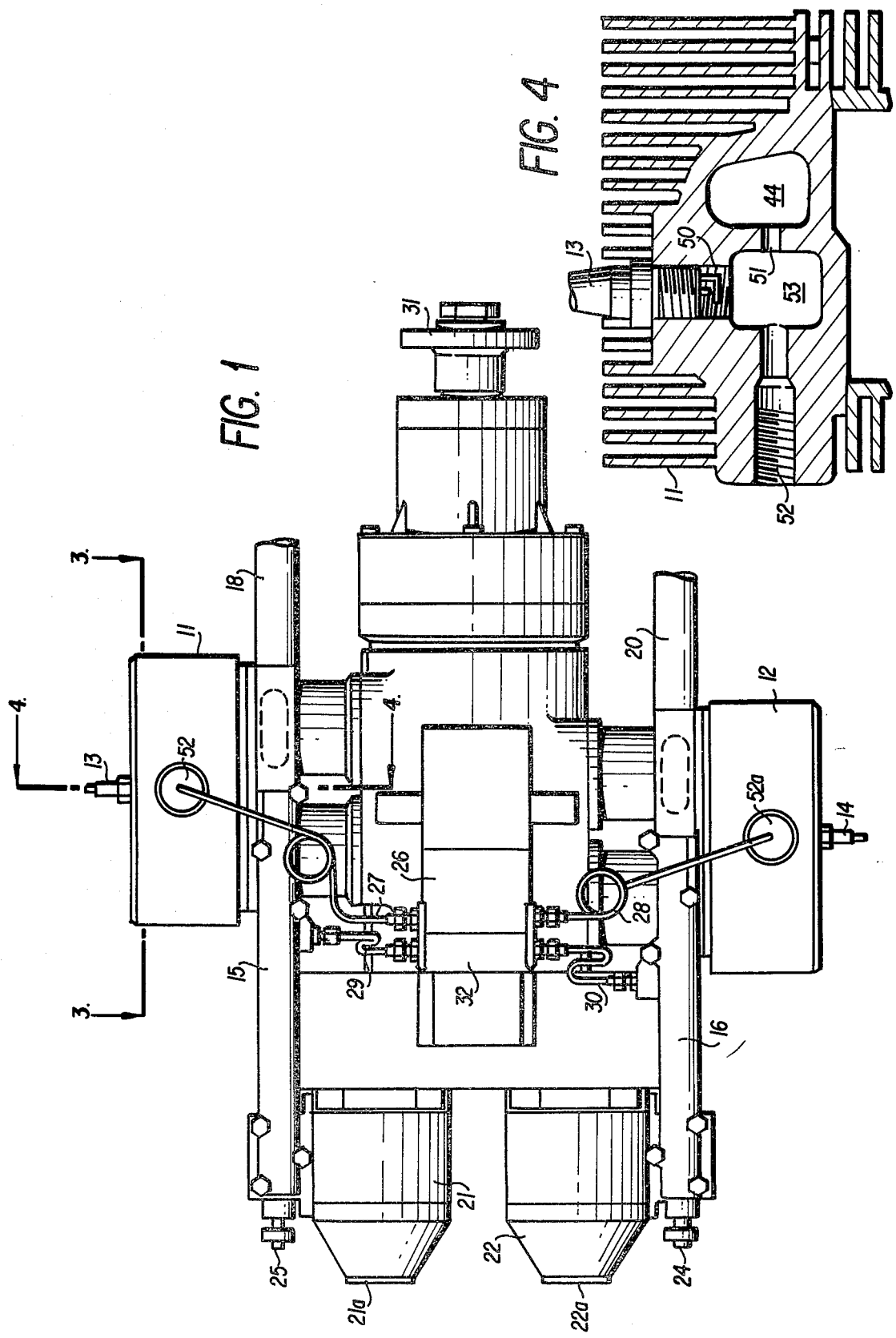

INTERNAL COMBUSTION ENGINE

This is a continuation-in-part of Ser. No. 814,662 filed Oct. 27, 1977 now abandoned.

BACKGROUND OF THE INVENTION

This invention relates to internal combustion engines which employ a stratified charge at stoichiometric mixture for igniting a leaner mixture of fuel. More particularly, a super charged internal combustion engine with auxiliary chamber fuel injection is provided with the manifold fuel injection mixture comprising a stoichiometric mixture for igniting a leaner mixture of fuel.

Recent interest in improving the efficiency of internal combustion engines has encouraged the development and use of a stratified charge for igniting a leaner source of fuel mixture whereby the total fuel intake for the engine is minimized. An example of this development is shown in U.S. Pat. No. 3,970,054, and other references whereby an internal combustion engine is equipped with an auxiliary chamber for receiving a stoichiometric fuel mixture. The stoichiometric fuel mixture is received in an auxiliary chamber and is ignited by a spark plug having electrodes protruding into the auxiliary chamber. The auxiliary chamber has a small channel member which communicates with the top of the piston of the internal combustion engine. A leaner fuel mixture introduced to the cylinder is ignited by the flame front produced in the auxiliary chamber. The combination of the rich fuel mixture with a leaner fuel mixture produces the stratified charge producing complete combustion of both fuels.

The present invention provides a structure for increasing the fuel efficiency of an internal combustion engine which is equipped to be fed with a stratified charge. Internal combustion engines according to the present invention provide a minimum loss in power during the exhaust stroke of the piston, while maintaining fuel efficiency.

SUMMARY OF INVENTION

It is a general object of this invention to provide an improved internal combustion engine which has a stratified charge.

It is a specific object of this invention to increase the efficiency of an internal combustion engine which is fuel injected.

It is still another object of this invention to provide improved super charging capabilities in an internal combustion engine.

These and other objects are provided in an internal combustion engine according to the invention. A multicylinder internal combustion engine is provided having an auxiliary chamber for receiving a stoichiometric fuel mixture. A second chamber is provided to connect at least two adjacent cylinders whereby a lean mixture of fuel and air introduced into a cylinder is compressed, and a channel connects the second chamber with the auxiliary chamber. A suitable ignition source such as a spark plug is located to communicate with the auxiliary chamber whereby a fuel mixture introduced to the auxiliary chamber is ignited. The ignition of a stoichiometric fuel mixture within the auxiliary chamber communicates with the leaner fuel mixture through the connecting channel thereby igniting the leaner fuel mixture.

In a preferred embodiment of the apparatus, a four cylinder horizontally opposed two cycle internal combustion engine is provided. To one side of the engine are located two adjacent cylinders, and to the opposite side two additional adjacent cylinders are located. The first of the adjacent cylinders is provided with an intake port, and the second is provided with an exhaust port adjacent to the intake port.

The adjacent cylinders contain adjacent pistons timed 30° apart. All pistons are connected to a common crank shaft which provides the desired timing for the pistons. The head for sealing the tops of adjacent cylinders is provided with a second chamber connecting the tops of the cylinders. This second chamber, referred to as a U-chamber, communicates with an auxiliary chamber in each head through a small channel. Fuel is alternately injected into each auxiliary chamber where it is ignited by a spark plug connected to an ignition circuitry. The leaner fuel mixture is introduced through the intake port and, compressed into the U-chamber by the cylinders and is ignited by the burning fuel in the auxiliary chamber. The alternate combustion attained in the two cylinder heads produces a rotational torque to the crank shaft connecting all the pistons.

In the preferred embodiment, a super charger is provided for forcing air into the intake manifolds connected to the intake ports. The super charger of the present invention provides for a variable supply of intake air which may be controlled by throttle means connected to the super charger.

In the preferred embodiment, fuel injection into the auxiliary chambers is accomplished by a novel fuel injection pump assembly which is operated by a rotating shaft. The fuel injection pump assembly is coupled to a rotating shaft which may be a cam shaft in a manner which will just prior to the ignition of a particular auxiliary chamber provide a stoichiometric mixture to the respective auxiliary chamber where it is ignited.

DESCRIPTION OF THE FIGURES.

FIG. 1 is an overall view of a four cylinder horizontally opposed single crank shaft engine in accordance with a preferred embodiment of the invention.

FIG. 4 is a sectional view of the cylinder head of FIG. 1.

DESCRIPTION OF THE PREFERRED EMBODIMENTS

Figure 3:
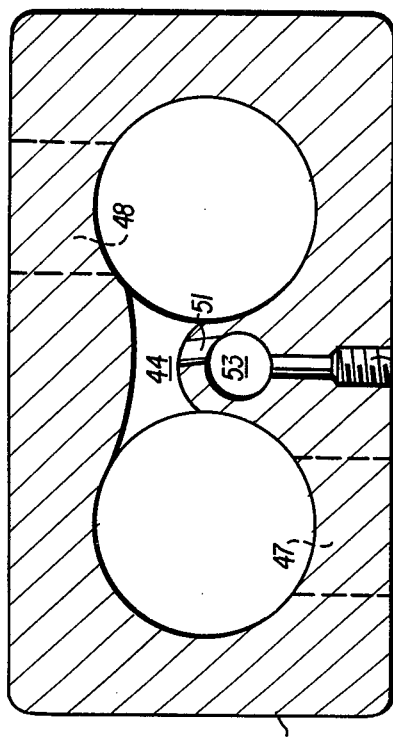
FIG. 3 is a sectional view of the cylinder head shown in FIG. 1.

Referring now to FIG. 1, there is shown a four cylinder horizontally opposed two cycle internal combustion engine according to a preferred embodiment of the present invention. The engine has two adjacent cylinders horizontally opposed to two additional adjacent cylinders. Cylinder head 11 seals a first pair of cylinders and cylinder head 12 seals a second pair of adjacent cylinders. A single spark plug 13, 14 is located in each of the cylinder heads 11, 12, for igniting the fuel mixture of adjacent cylinders. Each pair of cylinders has an intake manifold 15, 16 and an exhaust manifold 18, 20 connected to intake and exhaust ports in the cylinders. The intake manifolds 15, 16 are connected to an intake port of one of the pair of adjacent cylinders, and the exhaust manifolds 18, 20 are connected to the exhaust ports of remaining cylinders of the pair. Cylinder heads 11 and 12 receive an injected stoichiometric mixture of fuel through fuel inlets 52, 52a. The intake manifolds 15, 16 receive a leaner mixture of fuel from conduits 29 and 30.

The engine shown in FIG. 1 has a fuel injector assembly 26 which alternately supplies a pressurized pulse of fuel through conduits 27 and 28 to the respective cylinder heads 11 and 12. Conduits 29 and 30, connected to the fuel pump 32, supply a continuous stream of fuel to the intake manifolds 15 and 16 whereby a stream of air is mixed therewith for providing a lean fuel mixture. Connected to the respective intake manifolds 15 and 16 are blowers 21 and 22 for providing super charging to the lean mixture of fuel. Throttle means 25 and 24 are connected to the respective blowers in order to regulate the amount of air being mixed with the fuel stream within the intake manifolds 15 and 16. A power shaft 31 couples the torque provided by a crank shaft connected to the pistons within each cylinder to an external load.

Figure 2:
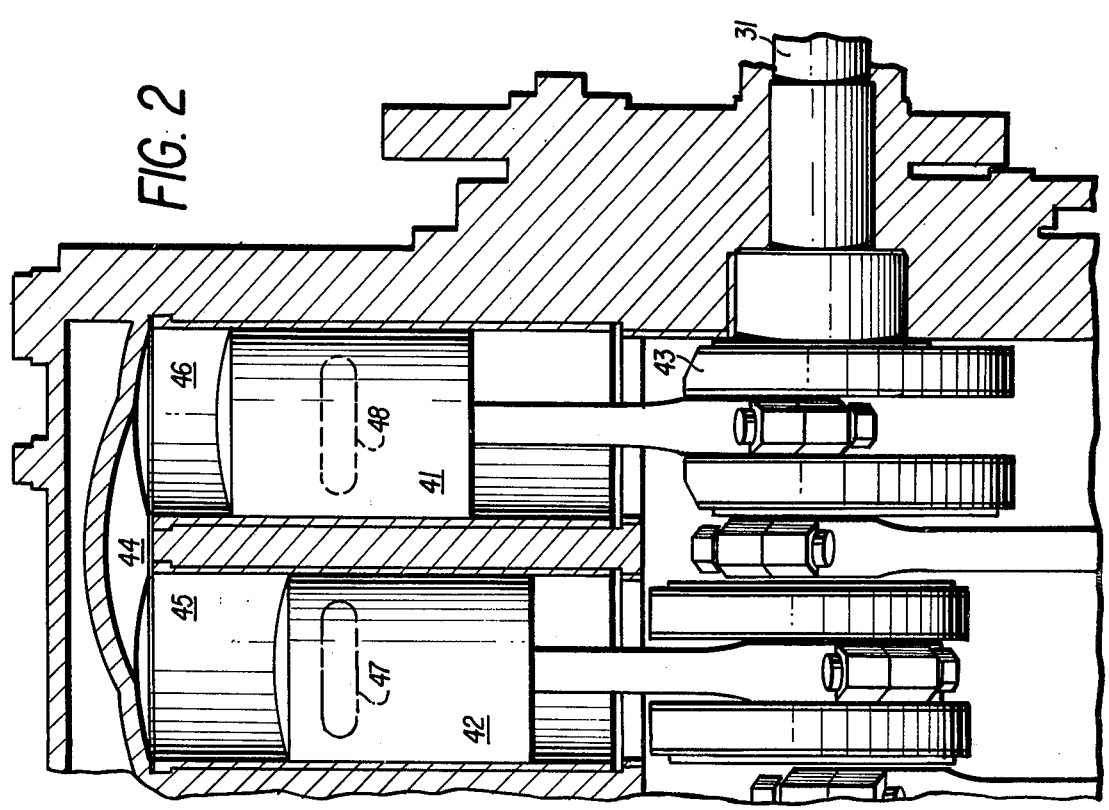
FIG. 2 is a sectional view of the engine of FIG. 1.

Referring now to FIG. 2, a sectional view of the internal combustion engine of FIG. 1 taken along lines X—X illustrates two adjacent pistons 41 and 42 connected to a common crank shaft 43. The crank shaft 43 is also connected, not shown, to the two additional pistons included in the engine of FIG. 1. The cylinders 45, 46 are open at the top to a common chamber 44 which connects the top of each cylinder. The pistons 41 and 42 perform an intake and exhaust function. Cylinder 45 contains an intake port 47 which receives the lean fuel mixture from the intake manifold 15 of FIG. 1. Cylinder 46 contains an exhaust port 48 located adjacent to the intake port 47. The crank shaft 43 has connecting journals which maintain piston 42 ahead of piston 41 at a 30° timing interval from each other. There is an additional 150° between each pair of pistons.

Figure 5:
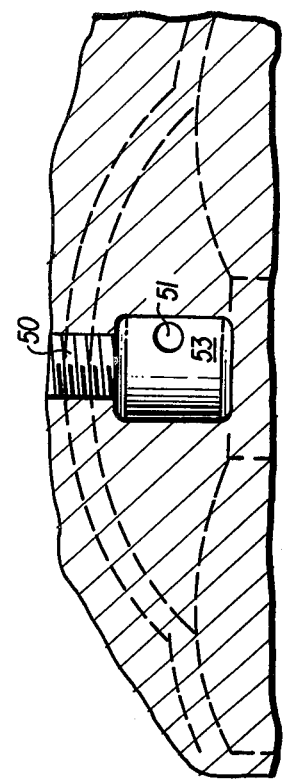
FIG. 5 is an additional sectional view of the cylinder head for the two adjacent cylinders.

Referring now to FIG. 3 and FIG. 5, there is shown a sectional view of the cylinder head 11 for enclosing the tops of the respective cylinders 45, 46. The U-chamber 44 connecting both cylinders is adjacent to an spark plug chamber 50. An auxiliary chamber 53, directly under the spark plug chamber 50, is connected to U-chamber 44 through a channel 51. A stoichiometric fuel mixture is introduced to the auxiliary chamber 53 through fuel inlet 52.

Referring to FIG. 4, the position of the spark plug 13 for igniting the stoichiometric mixture is shown. The spark plug 13 is placed in spark plug chamber 50 whereby it communicates directly with the auxiliary chamber 53. As fuel is received by fuel inlet 52, the spark plug 13 will ignite the mixture in auxiliary chamber 53. The ignited mixture is communicated through channel 51 to a leaner mixture of fuel introduced into U-chamber 44. The leaner mixture of fuel is compressed by the pistons 41, 42 prior to ignition.

The structure according to the foregoing, permits leaner fuel introduced by the intake manifold 15 into the cylinder 45 containing piston 42 to be compressed into U-chamber 44. The compressed mixture is ignited by the flame front produced when the stoichiometric mixture in auxiary chamber 53 is ignited. The structure provides a double stratified charge for combustion within adjacent cylinders. The motion of the pistons 41, 42 motivates the compressed gasses in the U-chamber. Because the pistons 41, 42 are advantageously timed 30° apart, the compressed gasses oscillate between the tops of the respective pistons 41, 42. This flow of compressed gases past channel 51 spreads the flame from the auxiliary chamber to the combustion area adjacent the pistons 41, 42. Pistons 41 and 42 after ignition provide rotation of crank shaft 43 which is engaged with power shaft 31.

Timing and fuel injection of the apparatus of FIG. 1 may be controlled by a conventional cam shaft which is geared to the crank shaft 43. The cam shaft synchronized with the crank shaft 43 will activate fuel injector assembly 26 to provide an injection of the stoichiometric fuel mixture into a given auxiliary chamber. The cam shaft is also connected to a standard ignition system comprising a set of breaker points and high voltage coil with a distributor for alternately providing a high voltage pulse to spark plugs 13 and 14. The ignition and fuel injection is timed such that the auxiliary chamber for the respective adjacent cylinders to be ignited receives a mixture of fuel just prior to ignition and during ignition. After the fuel mixture in the adjacent cylinder has been ignited, the alternate adjacent cylinders go through the same sequence of fuel injection and ignition via the fuel injector 26 and conventional ignition means not shown. A throttle linkage may be connected to throttle means 24 and 25 whereby the amount of air produced by blowers 21 and 22 which is directed into the intake manifolds 15 and 16 is controlled. Air enters input port 21a and 22a whereby valve means associated with the blowers 21, 22 controls the amount of air in intake manifolds 15 and 16.

The two cycle engine of the preferred embodiment does not require that the fuel be mixed with oil for lubrication. Rather, it is intended that a double oil pump will be connected to the crank case with a separate oil reservoir for circulating the oil within the crank case.

Figure 6:
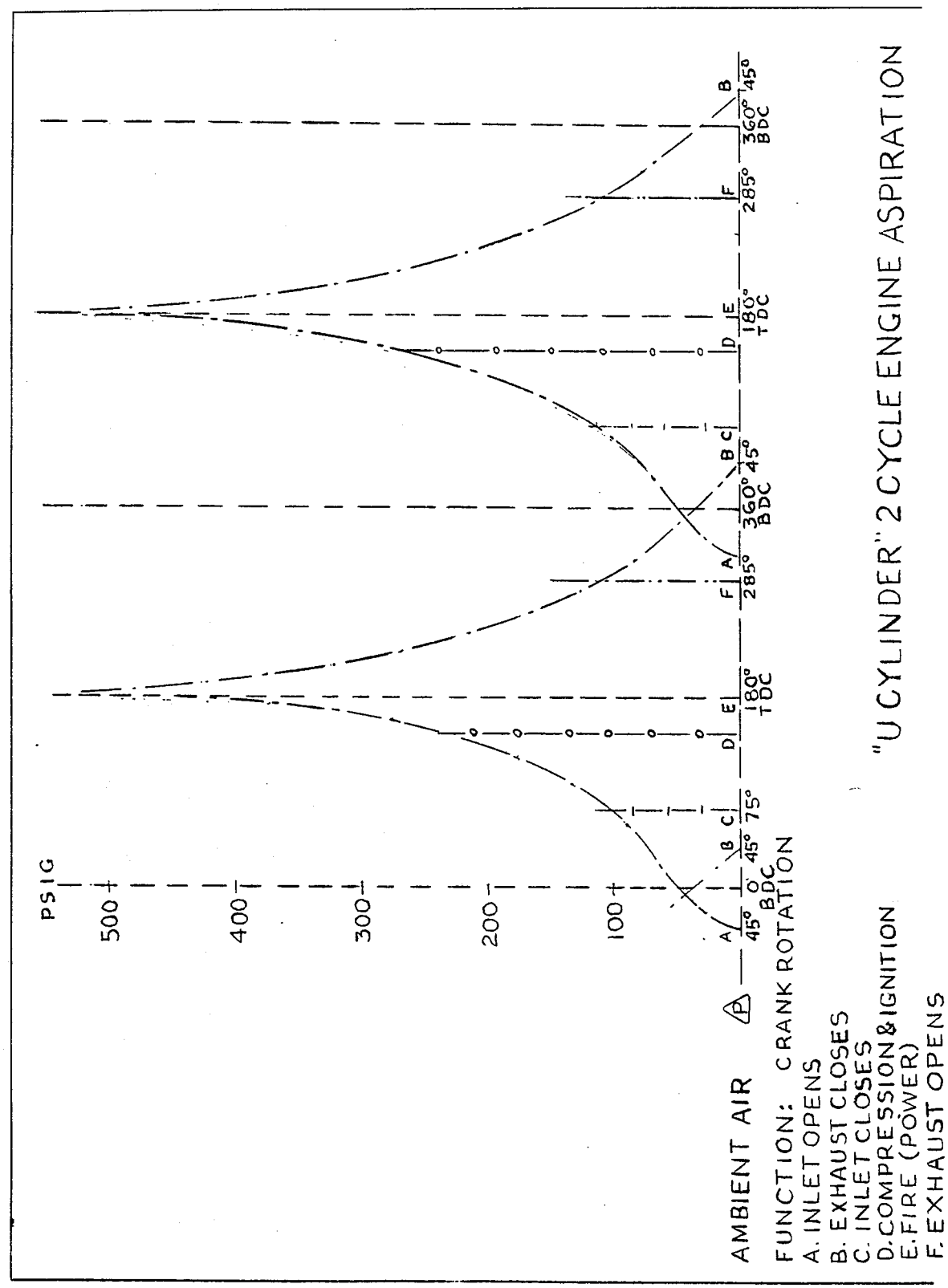
FIG. 6 is a graph of the aspiration cycle of the engine of FIG. 1.

The aspiration cycle of the previously described engine is shown in the graph of FIG. 6. The beginning of a cycle occurs with a nominal pressure within the cylinder where the intake manifold 15 is opened to the cylinder by virture of the piston associated with the intake manifold being at 45°. As the piston 42 reaches bottom dead center, more fuel is taken in through the intake manifold 15 and the piston 42 begins to rise and compress the mixture. At point B, the exhaust manifold port is closed by the position of the adjacent piston 41 with respect to the exhaust port 48. As the pistons move toward the top of the cylinder, point C indicates a point in which the intake port 47 is closed by the position of piston 42. Compression continues to increase until point D is reached which indicates that the ignition commences by virtue of the spark plug 13 igniting the stoichiometric mixture within the auxiliary chamber 53. As can be seen from the aspiration cycle, the pressure within the cylinders increases to a maximum at point E and thereafter decreases. Point F represents the point at which the exhaust port 48 opened by virtue of the piston in the exhaust cylinder being below the exhaust port 48. Pressure continues to fall and at point A, the inlet port opens. The pressure within the cylinders will begin to increase again. Because of the relative timing between the pistons in the intake cylinder and exhaust cylinder, advantageously selected to be about 30°, and the adjacent location of the exhaust port 48 and intake port 47 for the adjacent cylinders, the pressure within the cylinder will increase rapidly to repeat the cycle over again. During the period in which the intake 47 is open exhaust port 48 is closed for 30°, and pressure continues to build within the cylinders. Those skilled in the art will recognize that this ability to increase pressure within the cylinder while having the intake port open increases the available power of the engine. Also, the advantages of super charging are realizable in an engine of that design since there is no loss of pressure.

The foregoing description is exemplary only of a four cylinder internal combustion engine according to the present invention. A six cylinder internal combustion engine according to the foregoing description is also possible using three pairs of adjacent cylinders. Adjacent pistons are maintained at the 30° relative timing, with an additional 90° between each pair of adjacent cylinders.

The aforementioned fuel injected four cylinder engine is preferably super charged by means of two blowers 21 and 22 shown in FIG. 1. A preferred blower for this purpose is shown in FIG. 7.

Figure 7:
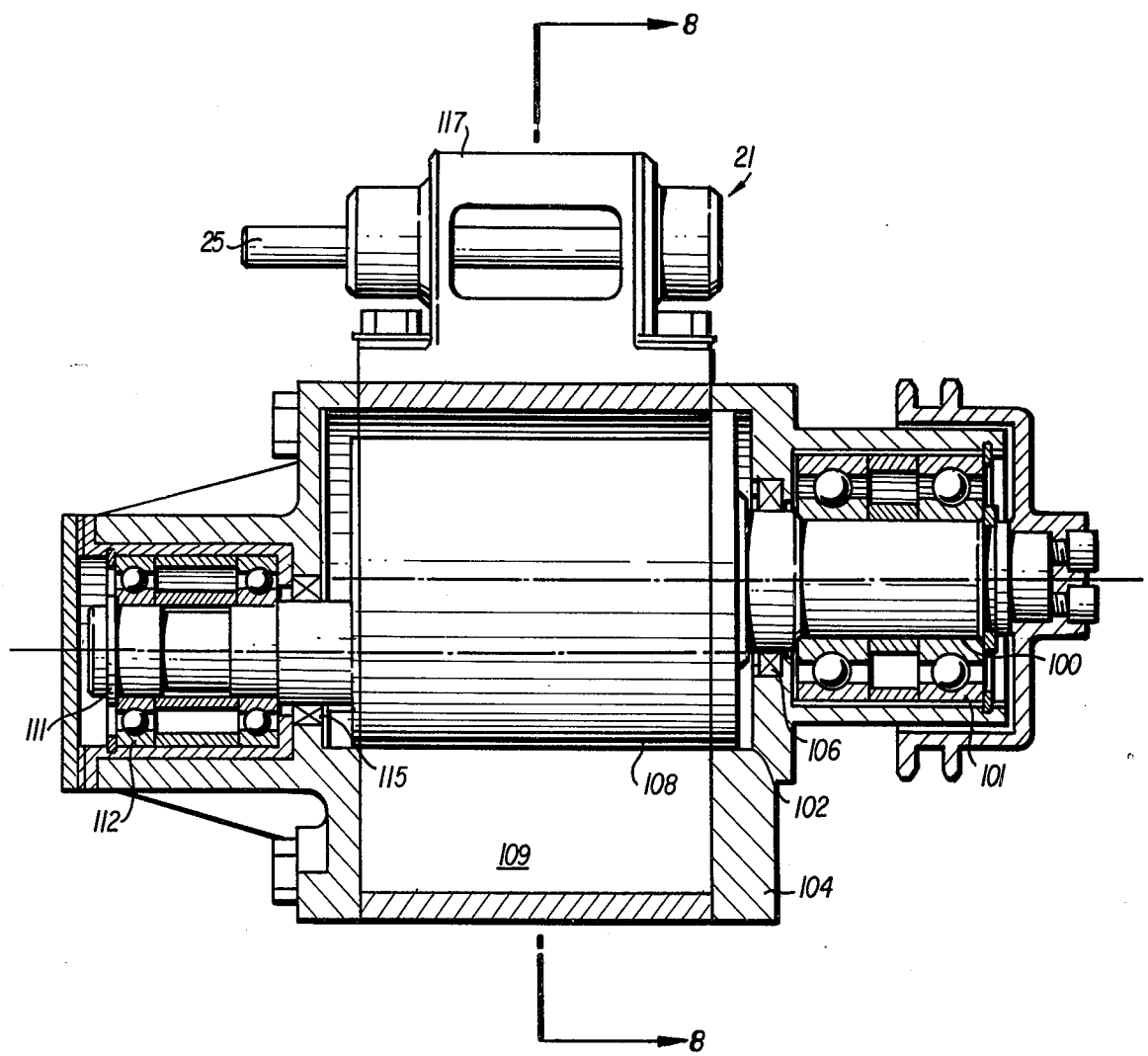
FIG. 7 is an overall view of a blower which is useful for supplying air to an intake manifold.

The blower 21 shown in FIG. 7 may be conveniently connected to a cam shaft or to other drive means associated with the internal combustion engine. Alternatively, an electric motor may also be implemented to rotate a vane within the blower.

The blower 21 receives a driving torque through a shaft 100 which is supported by a bearing assembly 101. The shaft 100 is coupled to a flange 102 through housing 104. Housing 104 is provided with seals 106 in which to maintain a substantially air tight compartment 109 within the housing 104.

A cylinder 108 is axially supported to the disk 102 for rotation. The cylinder 108 is tangential to the interior housing surface which is also cylindrical in shape.

The housing has a second shaft 111 located opposite to shaft 100 supported by bearing assembly 112 having an axis of rotation offset from that of shaft 100. Seals 115 are also provided to maintain the air pressure in compartment 109. At the top of housing 104 is located a valve assembly 117 for controlling the volume of air delivered by the blower 21. Rotation of throttle means 25 controls the flow of air produced by the blower 21.

Figure 8A:
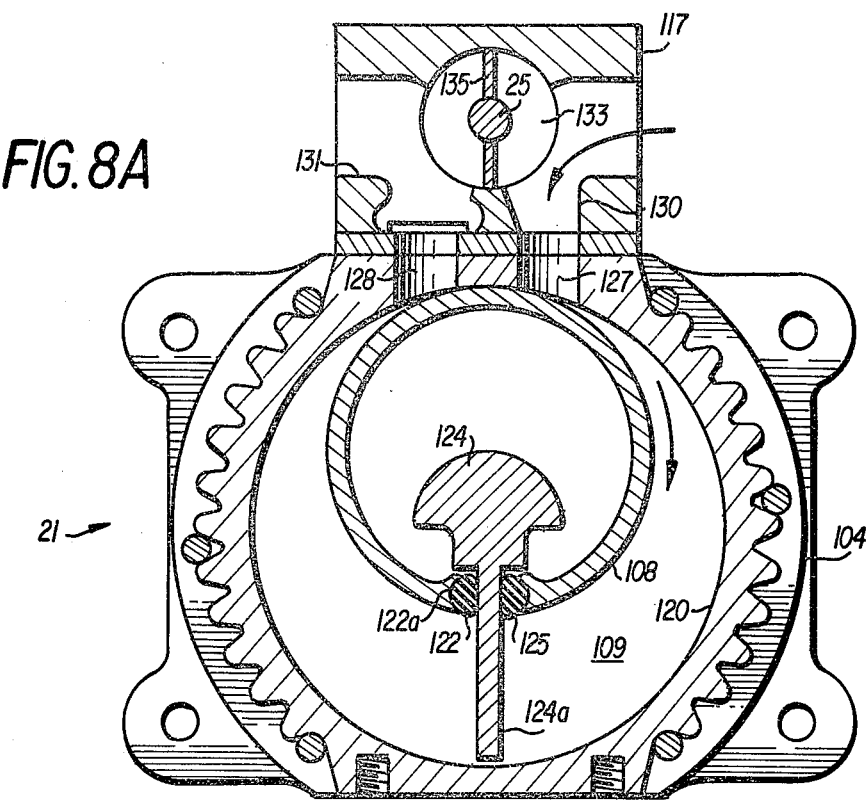
FIG. 8A is a sectional view of the blower of FIG. 7 taken along lines A—A.
Figure 8B:
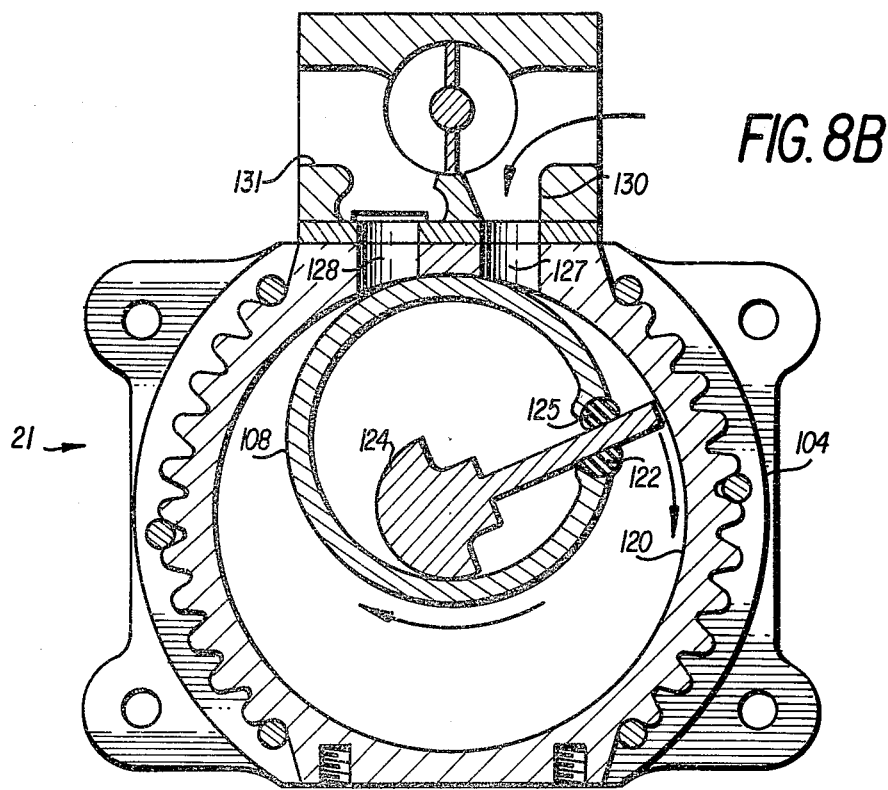
FIG. 8B is the same view as FIG. 8A with the rotational position of the vane member changed.

Referring now to FIGS. 8A and 8B, the inner surface 120 of the housing 104 is shown to be cylindrical with an axis coincident with the axis of rotation of shaft 111.

Cylinder 108 has a longitudinal slot 122 along its length. The shaft 111 of FIG. 7 connects to a vane 124. The vane 124 is coupled to shaft 111 and rotates around an extended axis of shaft 111 as the cylinder 108 is rotated. That portion of the vane extending through the slot is sealed with rocking seals 125. Rocking seals 125 have an exterior convex shape for mating with a concave form 122a along the slot 122. The rocking seals 125 permit the vane 124 to rotate in conjunction with the cylinder 108 without binding. However, as FIGS. 8A and 8B indicate, the vane is slideable within the seals 125.

Cylinder 108 is positioned so that it is tangential with the inner surface 120 of the housing 104. On each side of the line of tangency is located first and second ports 127, 128. These ports communicate with two channels 130 and 131 in the valve assembly 117. Valve assembly 117 contains a bypass channel 133. A valve member 135 is supported within the bypass channel 133 for controlling the amount of air entering the bypass channel.

The operation of the blower 21 commences upon rotation of the cylinder 108. The cylinder 108 forces vane 124 to rotate around the axis of shaft 111. Motion of the vane 124 draws air into compartment 109 through opening 127 and channel 130. The entering air is pulled towards the trailing edge 124a of the vane 124. The tangential relationship of the cylinder 108 with respect to the inner surface 120 of housing 104 keeps the air from entering port 128.

The vane 124 during rotation forces air out of port 128 through channel 131. The volume of air produced by channel 131 is regulated by the position of valve member 135 which is pivotally supported by throttle means 25.

Thus, blower 18 provides an adjustable supply of air suitable for super charging an internal combustion engine according to the foregoing description. The vane 124 has its tip portion spaced from the inner surface 120, and isolation between ports 127 and 128 is provided by the tangential relationship of the cylinder 108 and the inner surface 120 of housing 104.

The internal combustion engine of FIG. 1 is fuel injected with a pump assembly 26 which is preferrable according to the pump assembly shown in FIG. 9. The pump assembly 200 comprises two injector pumps 201 and 203 mounted opposite each other. Each injector pump 201 and 203 has an actuating member 205, 207, which when axially moved causes a predetermined quantity of fuel to be produced from outlets 209, 211.

Actuating members 205 and 207 are sequentially axially moved by a cam roller 213 located on a rotatable disk 215. Disk 215 is suitably coupled to a shaft 217 through a spline arrangement. Shaft 217 is rotated by a cam shaft or other means coupled to the internal combustion engine crank shaft. The axis of rotation of disk 215 is selected to be along a line which is coincident with a line midway between the actuating members 205, 207. Cam roller 213 is located on a radius of the disk 215 whereby the cam roller 213 will alternately strike and axially move actuating members 205, 207 providing alternate pulses of fuel from outlets 209 and 211.

Figure 9A:
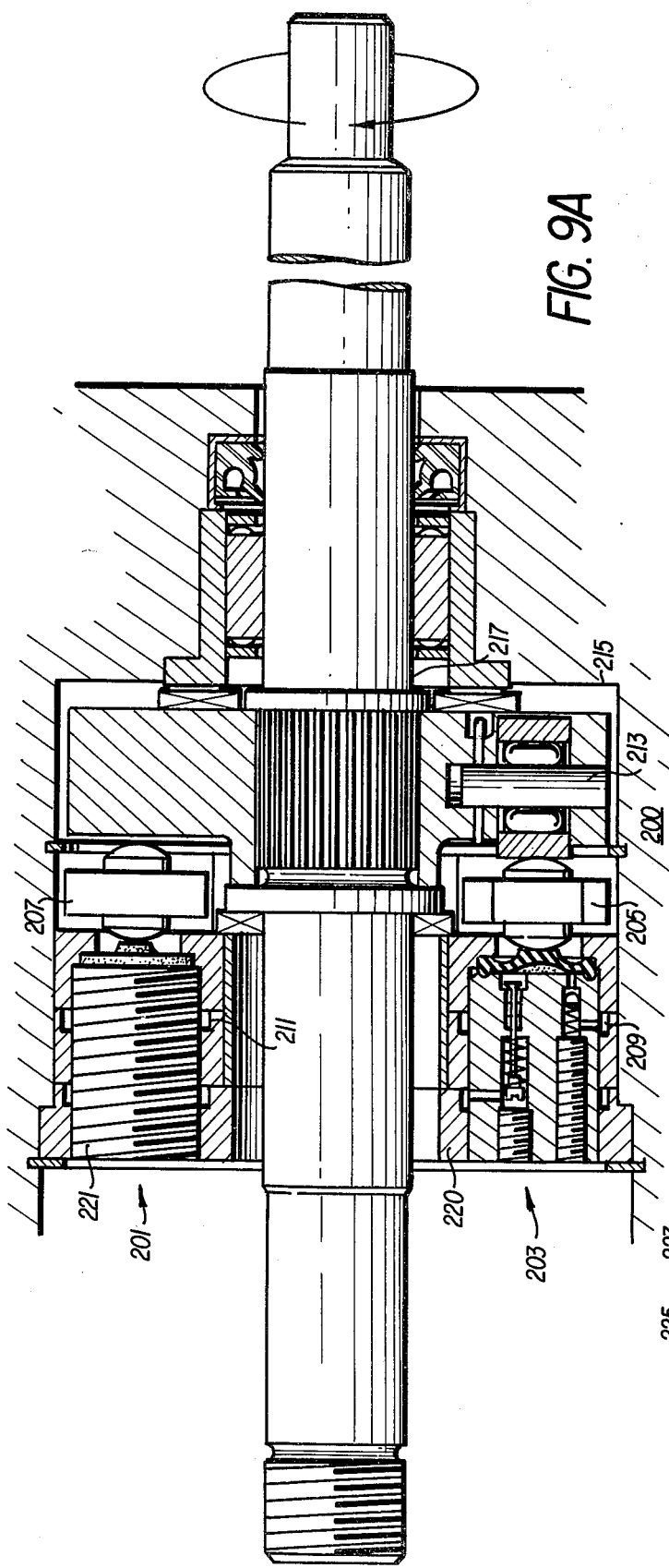
FIG. 9A is a sectional view of a preferred fuel injector.

FIG. 9A indicates that injector pumps 201 and 203 may comprise a subassembly 220 and 221 which may be threaded to a fixed housing or stationary port of the internal combustion engine 223. The actuating means 205, 207 includes a tappet engaging the subassembly.

Figure 9B:
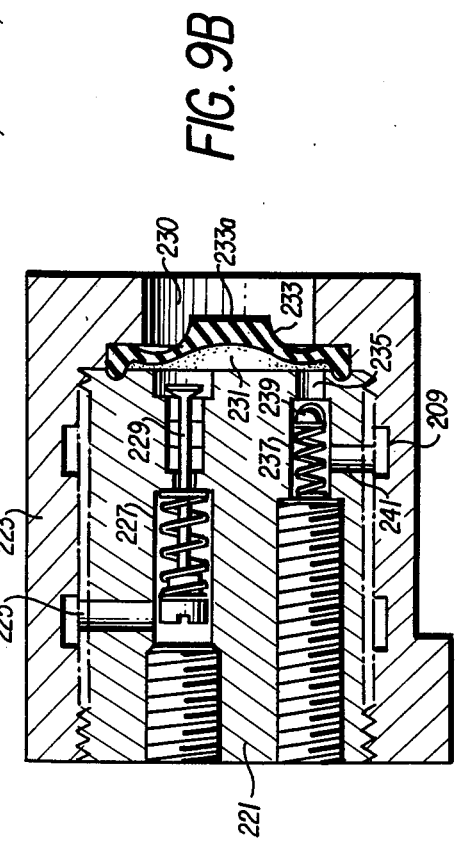
FIG. 9B is an expanded view of a portion of the fuel injector of FIG. 9A.

The subassembly may be more clearly understood by referring to FIG. 9B. Inlet 225 is adapted to receive a fuel from a reservoir not shown. Fuel entering inlet 225 enters a first channel 227 equipped with a spring load valve 229. The first channel 227 terminates in a compartment 231 which is divided by a diaphragm 233. The diaphragm 233 may be steel with double back curves which readily flex upon being struck. On the rear side of the diaphragm 233 is a portion 233a which extends through compartment 231 and is engageable with the tappet of the actuating members 205, 207. The tappet resides in a bore 230 of the housing 223. The remaining portion of the compartment may be back filled with an oil under pressure maintaining the diaphragm from blowing outward due to fuel pressure.

Compartment 231 has an outlet 235 which enters a second channel 237 equipped with a spring loaded ball 239. The second channel 237 terminates in an outlet 241 providing the discharged fuel.

The operation of the subassembly is such that fuel may enter inlet 225 with sufficient pressure that valve 229 opens to fill compartment 231. When diaphragm 233 is flexed, fuel in the compartment 231 is forced past ball 239 to outlet 241. The pressure applied to the fuel by diaphragm 233 closes valve 229 prohibiting fuel from being forced into channel 227 from compartment 231.

Thus there is described a fuel injector assembly suitable for fuel injecting the internal combustion engine of FIG. 1. The internal combustion engine of FIG. 1 also requires a continuous stream of fuel into intake manifold 15, 16. This stream may be provided by a standard fuel pump 32 known to those skilled in the art coupled to the same rotating shaft 217 used to operate the injector assembly.

Thus there is described an improved fuel injected super charged internal combustion engine. The internal combustion engine provides increased efficiency by providing an improved mechanism for burning a stratified charge coupled with improvements in fuel injection and supercharging, defined more particularly by the claims which follow.

What is claimed is:

1. A two cycle internal combustion engine having first and second adjacent cylinders, said first cylinder having an intake port connected to receive a lean mixture of fuel and air, said second cylinder having an exhaust port for delivering combustion products from said cylinder, first and second pistons located within said cylinders, a crank shaft for connecting each of said pistons to a power shaft, further comprising a cylinder head for sealing the tops of said cylinders, said cylinder head having an auxiliary chamber for receiving a timed pulsating fuel stream, a second chamber for joining the top of said cylinders into which said first piston compresses said lean mixture of fuel, a connecting channel for connecting said auxiliary chamber to said second chamber at a point between said cylinders, and means for sequentially igniting the fuel in said auxiliary chamber whereby a flame is produced for igniting a lean mixture of fuel and air in said second chamber, said first and second pistons having a relative timing whereby compressed gases in said second chamber are motivated during ignition thereof between the tops of said pistons communicating with the flame from said connecting channel spreading the flame from said auxiliary chamber through said second chamber.

2. The internal combustion engine of claim 1 further comprising means for changing the volume of air mixed within said intake port.

3. The internal combustion engine of claims 1 or 2, wherein said pistons are timed relative to each other at substantially 30° for facilitating spreading of said flame to each of said cylinders.

4. The internal combustion engine of claim 3, wherein said connecting channel enters said second chamber at substantially a right angle.

5. A two cycle internal combustion engine having at least two cylinders, said cylinders having a piston within operatively connected to a crank shaft, each of said pistons being connected to said crankshaft to provide a relative displacement therebetween, an intake manifold connected to an intake port of one of said cylinders for providing a mixture of air and fuel, an exhaust manifold connected to an exhaust port on the remaining cylinder, and means for sealing the tops of said cylinders, said means including an auxiliary chamber for receiving a mixture of fuel, a second chamber for connecting the tops of said cylinders, means for igniting fuel within said auxiliary chamber and a channel connecting said second chamber at a point between said cylinders with said auxiliary chamber whereby compressed gases are ignited in said second chamber by a flame produced in said auxiliary chamber, said relative displacement motivating the compressed gases within said second chamber whereby they are ignited by said flame and said flame is spread between said cylinders.

6. A two cycle internal combustion engine comprising:
 at least two adjacent cylinders for receiving first and second pistons, one of said cylinders having an inlet for receiving a lean mixture of fuel and air, the remaining cylinder having an outlet for delivering combustion products;
 first and second pistons disposed within said cylinders;
 a crank shaft connected to said pistons, said crankshaft providing a relative timing between said pistons;
 a cylinder head for sealing one end of said cylinders, said cylinder head providing a combustion chamber for each of said pistons, said combustion chambers being connected together by a common chamber, an auxiliary chamber for receiving a pulsating fuel stream, said auxiliary chamber having an opening receiving a spark plug for supplying an ignition spark, and a channel connecting said common chamber at a point between said cylinders to said auxiliary chamber;
 an intake manifold connected to said inlet;
 a source of fuel connected to said intake manifold;
 a blower for delivering a selectable volume of air to said intake manifold whereby the air-fuel mixture is controlled;
 a fuel injector means connected to said auxiliary chamber for providing a stoichiometric fuel mixture for ignition by said spark plug, said ignited fuel mixture communicating with said common chamber whereby a leaner mixture of fuel moving therein in response to the relative motion of said pistons is ignited, said relative timing between pistons spreading the ignited fuel through the common chamber and producing a force against said pistons which rotates said crankshaft.

* * * * *